United States Patent
Aimar (10) Patent No.: US 7,792,615 B2
(45) Date of Patent: Sep. 7, 2010

(54) EMERGENCY DESCENT SYSTEM

(75) Inventor: Jeffrey L. Aimar, Seattle, WA (US)

(73) Assignee: The Boeing Company, Chicago, IL (US)

( * ) Notice: Subject to any disclaimer, the term of this patent is extended or adjusted under 35 U.S.C. 154(b) by 1015 days.

(21) Appl. No.: 11/175,060

(22) Filed: Jul. 5, 2005

(65) Prior Publication Data

US 2007/0043482 A1    Feb. 22, 2007

(51) Int. Cl.
G05D 3/00 (2006.01)

(52) U.S. Cl. .......... 701/11; 701/2; 701/3; 701/4; 701/5

(58) Field of Classification Search .......... 701/11, 701/14, 16, 18, 2, 3, 4, 5, 6; 244/75.1, 13, 244/76 R, 180, 190
See application file for complete search history.

(56) References Cited

U.S. PATENT DOCUMENTS

| | | | |
|---|---|---|---|
| 4,314,341 A * | 2/1982 | Kivela | 701/16 |
| 6,507,776 B1 * | 1/2003 | Fox, III | 701/11 |
| 6,584,383 B2 | 6/2003 | Pippenger | |
| 6,748,325 B1 * | 6/2004 | Fujisaki | 701/301 |
| 6,965,816 B2 * | 11/2005 | Walker | 701/16 |
| 2003/0066929 A1 | 4/2003 | Valencia | |

* cited by examiner

*Primary Examiner*—Tuan C To
*Assistant Examiner*—Redhwan Mawari
(74) *Attorney, Agent, or Firm*—Klintworth & Rozenblat IP LLC

(57) ABSTRACT

An emergency descent system is provided for automatically performing an emergency descent in a vehicle. The system monitors cabin pressure altitude and if the cabin pressure altitude exceeds a preset value, the emergency descent system, may direct the autopilot to descend the aircraft to the minimum safe altitude (MSA). The emergency descent system may also communicate with ground facilities informing them of the descent.

41 Claims, 8 Drawing Sheets

EMERGENCY DESCENT SYSTEM

FIELD OF THE INVENTION

The invention generally relates to systems which automatically take control of a vehicle when an operator becomes incapacitated. Specifically, the invention relates to systems which automatically initiate emergency descents in large commercial aircraft and provide information regarding route segments where an emergency descent may not be possible.

BACKGROUND

Operation of large commercial aircraft is governed by the Federal Aviation Regulations (FAR). Most large commercial aircraft operators operate under section 121 of the FARs which requires at least two pilots on the flight deck during normal operations. This requirement is due, in part, to the fact that a two pilot crew has an inherent backup capability. That is to say, the second pilot provides a backup safety mechanism and is able to perform any and all pilot duties should the first pilot become incapacitated or task saturated.

This inherent backup capability may be important during emergency situations, in particular, during rapid depressurizations. During a rapid depressurization, both pilots must use supplemental oxygen if the cabin pressure altitude exceeds 10,000 feet above mean sea level (MSL). If the cabin pressure altitude exceeds 10,000 feet MSL, there may be a danger of loss of consciousness (LOC) by one or both pilots depending on the actual cabin pressure altitude. The greater the cabin pressure altitude, the more quickly the pilots may lose consciousness. The elapsed time between the rapid depressurization and the time a pilot loses consciousness is called time of useful consciousness.

As stated above, the time of useful consciousness varies with the altitude of the aircraft. For example, at 18,000 feet MSL, the time of useful consciousness may be approximately 3-5 minutes. By contrast, the time of useful consciousness at a cabin pressure altitude of 45,000 feet may be as little as 5-15 seconds. It is critical that at least one pilot properly dons an oxygen mask before loss of consciousness. Having two pilots provides a margin of safety because it is more likely with two pilots that one of the two will successfully don the oxygen mask.

There exists a possibility of both pilots losing consciousness and/or one pilot being off of the flight deck during a rapid depressurization. In this case additional safety mechanisms would provide a greater safety margin in aircraft operations. Additionally, some aircraft operations under FAR part 91 may be conducted with a single pilot. Thus, additional safety mechanisms would be beneficial for these type operations as well.

The present invention is directed to overcoming one or more of the problems or disadvantages associated with the prior art.

SUMMARY

One aspect of the invention includes an emergency descent system for a vehicle having a processor, a memory accessible by the processor, the memory including a software program executable by the processor and one or more databases and a flight plan route. A navigation system that provides the processor with positional information and a static pressure instrument that provides the processor with static pressure data may also be included. An automatic pilot may control the vehicle when engaged, and wherein the processor monitors the static pressure instrument and the positional information, and directs the automatic pilot to decrease the vehicle altitude when the static pressure falls below a predetermined pressure.

A second aspect of the invention includes a method of reducing the altitude of a vehicle during an emergency including updating a vehicle position, monitoring a pressure indication, and alerting a crew if the pressure indication indicates an altitude above a predetermined altitude. The emergency descent system further determines a minimum safe altitude and may engage the automatic pilot and auto-throttles to control the vehicle while instructing the autopilot and auto-throttles to reduce the vehicle altitude to a safe level.

The features, functions, and advantages can be achieved independently in various embodiments of the present invention or may be combined in yet other embodiments.

Other aspects and features of the present invention can be obtained from a study of the drawings, the disclosure, and the appended claims.

DETAILED DESCRIPTION

Figure 1:
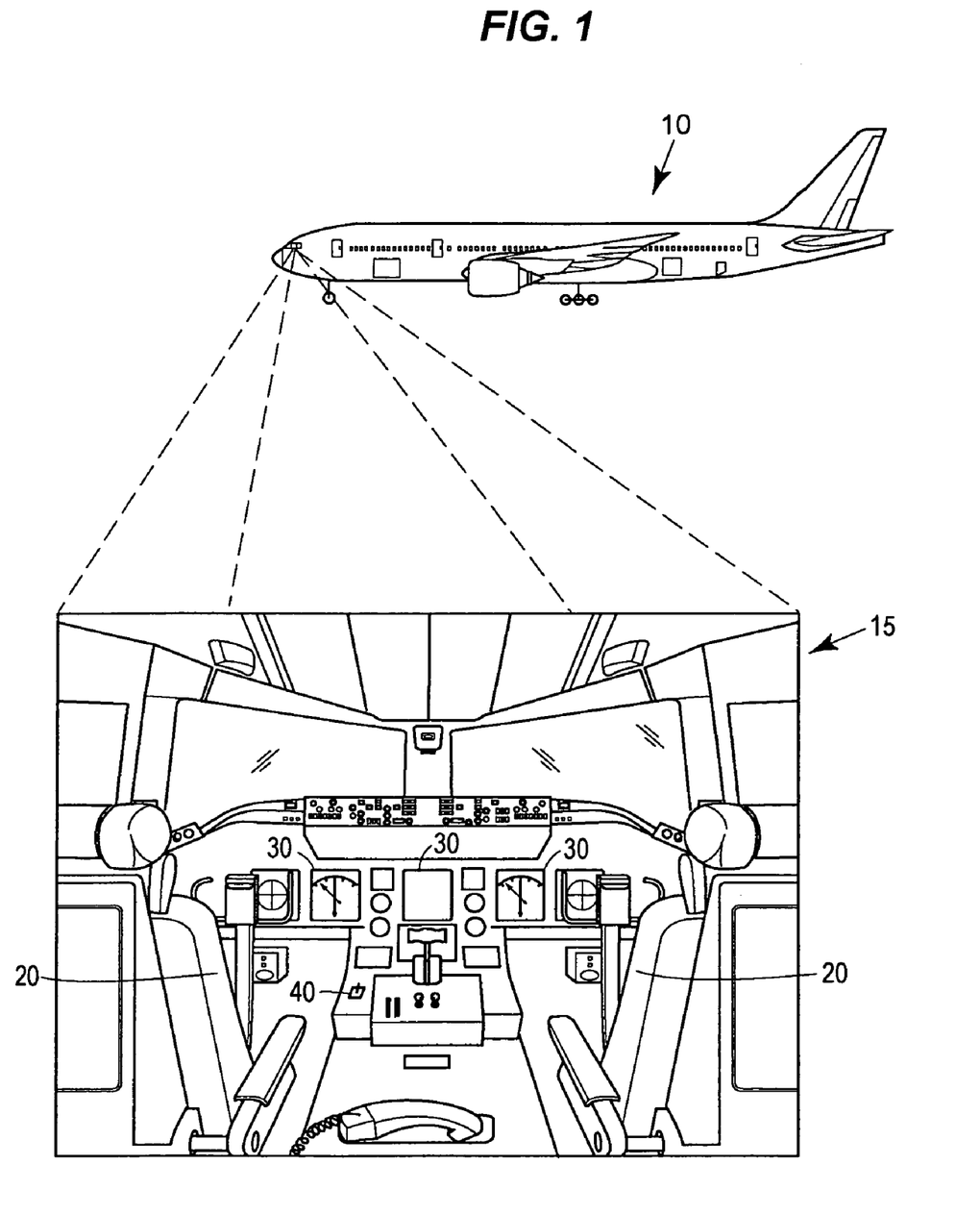
FIG. 1 shows an example of an aircraft and a flight deck on the aircraft.

FIG. 1 is a depiction of an aircraft 10 having a flight deck 15 and positions 20 for two pilots. Several examples of display screens 30 are shown in relation to the pilot positions 20. The display screens 30 are generally know as Multi-Function Display Units (MFDUs) and may be conventional Cathode Ray Tube (CRT) displays, liquid crystal displays, plasma displays, or any other type of display unit which may electronically display data. Additionally, a pilot interface device 40 may be installed on the flight deck 15.

Figure 2:
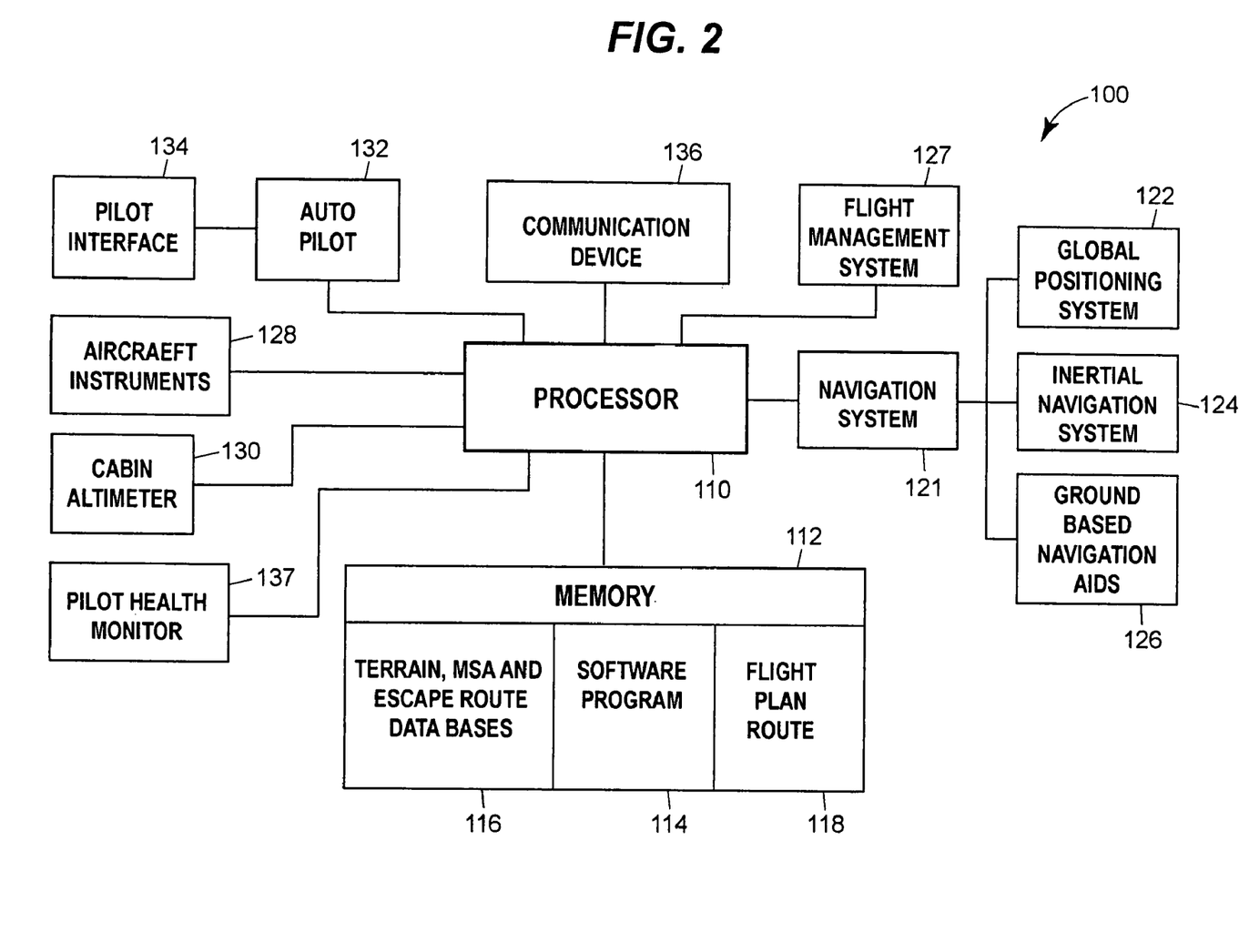
FIG. 2 is a schematic diagram of an emergency descent system.

FIG. 2 shows a schematic diagram of one embodiment of an emergency descent system 100. The emergency descent system 100 may include a processor 110 which has access to a memory 112. The memory 112 may include a software program 114 executable by the processor 110, one or more databases 116, and a flight plan route 118. The databases 116 may include information regarding Minimum Safe Altitudes (MSAs) and escape routes for portions of airways where the MSA is above a predetermined altitude (e.g., above 14,000 feet MSL). Additionally, the flight plan route 118 may be downloaded from another aircraft system, for example, the Flight Management System 127. The software program 114 may operate according to a logic diagram as discussed later.

The processor 110 may receive navigational inputs from a navigational system 121 which may generate an aircraft position based on inputs from an inertial navigation system (INS) 124, a global positioning system (GPS), 122 and/or ground based navigational aids (NAVAIDs) 126. In this way, the processor 110 may automatically update the position of the aircraft 10. The processor 110 may be operatively connected to a flight management system (FMS) 127 which may provide flight plan information to the processor 110.

The processor 110 may further monitor aircraft instruments 128 and a cabin altimeter 130. The processor 110 may be operatively connected to the autopilot system 132 having a pilot interface device 134. The processor 110 may be operatively connected to a communication device 136 which may enable the system to communicate with another aircraft and/or a ground station, for example, air traffic control, company dispatch or any other ground based station. Furthermore, the processor may be operatively connected to a pilot health monitoring system 137. The pilot health monitoring system monitors the pilot's health and alertness through any appropriate means, for example, heart rate, brain activity, respiration, blink rate and/or duration, etc.

Figure 3:
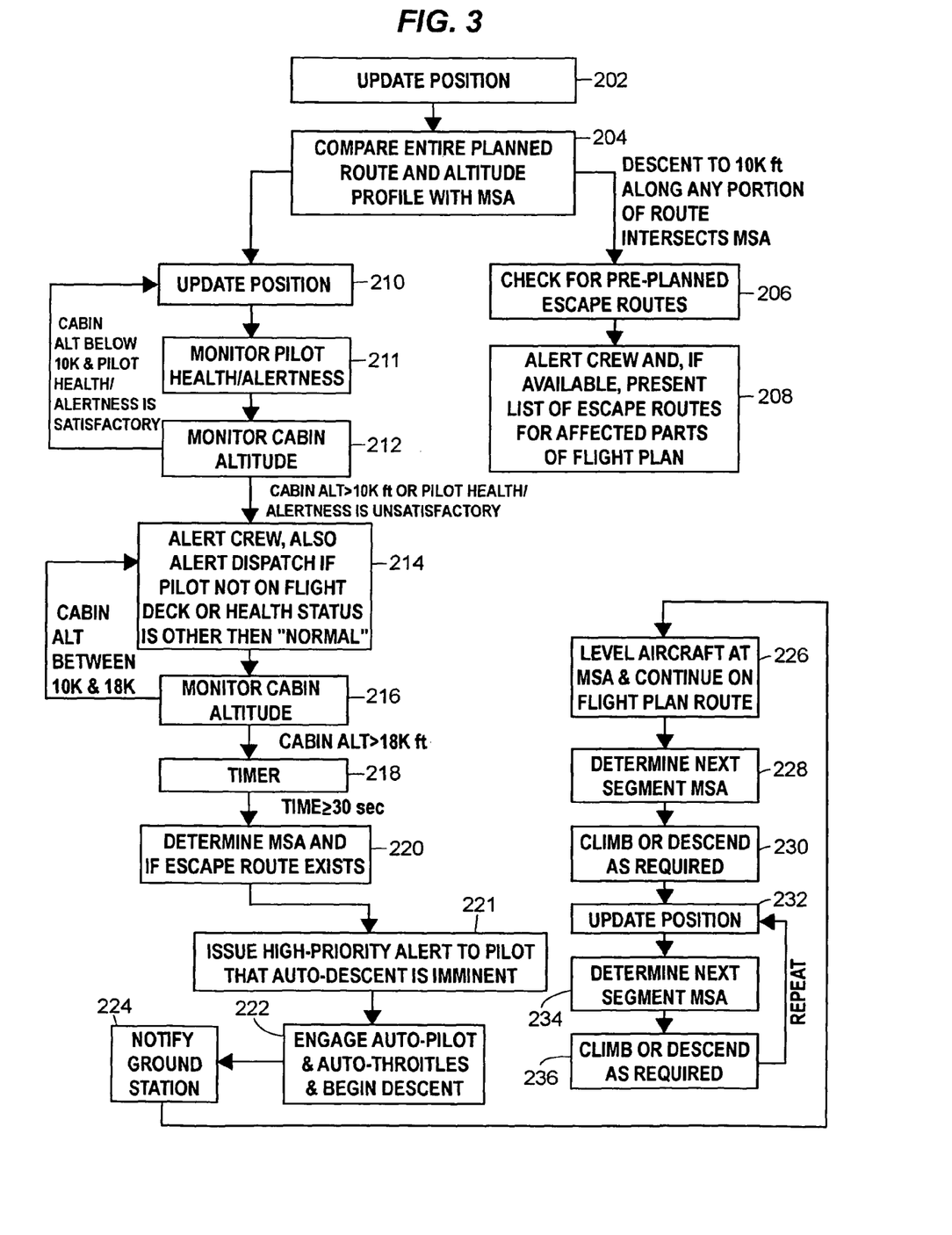
FIG. 3 is a logic diagram of the emergency descent system of FIG. 2.

FIG. 3 illustrates one embodiment of a logic diagram that the software program 114 of the emergency descent system 100 may follow. The software program 114 may begin at 202 by obtaining an updated aircraft position from another aircraft system, such as, for example the FMS or INU, or the user may input the current aircraft position directly into the emergency descent system 100. Regardless, the software program 114 may continue to obtain the flight plan at 204 either from another aircraft system or via direct input from the user. After receiving the flight plan, the system checks the planned route and altitude profile at 204 to determine if a descent to 10,000 ft along any flight plan segment intersects the MSA for that segment. If so, the system checks the database 116 at 206 for the existence of preplanned escape routes for that flight plan segment. If such a preplanned escape route exists, the system alerts the crew at 208 and stores the preplanned escape route for later reference if needed for use on the flight plan segment. Such preplanned escape routes may be defined for common airways, departures or arrivals wherein the MSA exceeds a predefined altitude, for example, 14,000 feet MSL. Once airborne, the system continuously updates the aircraft position at 210. The emergency descent system 100 may track aircraft position and compare the aircraft position with terrain heights from the databases 116 should the need for a descent exist.

After updating the aircraft position, the emergency descent system 100 may monitor the health and/or alertness of the pilot at 211. The health and/or alertness of the pilot may be monitored through the pilot health monitoring system 137 as discussed above. The pilot health monitoring system 137 may issue an alert to the pilot and/or a dispatch facility via the communication device 136 should the pilot become drowsy and/or incapacitated. Further, the emergency descent system 100 may monitor the cabin pressure altitude at 212 by receiving an input from the cabin altimeter 130 or an alternate pressure source (not shown). During cruise, the cabin pressure altitude may typically reach a maximum of around 8,000 feet above MSL. However, because the maximum altitude of an aircraft is typically based on the maximum certified differential pressure between the cabin and the ambient air pressure at altitude, the maximum cabin pressure altitude may be reached at different absolute aircraft altitudes for different aircraft. For example, a Boeing 757 may reach a cabin pressure altitude of 8,000 feet MSL at an aircraft altitude of 42,000 feet MSL, while a Boeing 737 may reach a cabin pressure altitude of 8,000 feet MSL at an aircraft altitude of 37,000 feet.

Regardless of aircraft type, if the cabin pressure altitude as monitored at 212 is less than a first preset altitude, for example 10,000 feet MSL (the altitude may be any preset altitude required by the user), and the pilots health/alertness is satisfactory, the emergency descent system 100 may return to 210 and update the aircraft position. As long as the cabin pressure altitude remains below the first preset value and the pilot's health/alertness remains satisfactory, the emergency descent system 100 may continually update the aircraft position at 210, monitor the pilot's health/alertness at 211 and monitor the cabin pressure altitude at 212.

If, however, the cabin pressure altitude should be above the first preset altitude at 212, or the pilot's health/alertness becomes unsatisfactory, the emergency descent system 100 may alert the crew and/or a ground facility at 214. This alert may be aural, visual and/or tactile and may involve sending signals to the pilot health monitoring system 137. Generally, the emergency descent system may alert the crew aurally with some type of warning horn (which may be a horn of any frequency, duration or volume, depending on user preferences) and/or a verbal alert, and visually by displaying an alert on a MFDU. Various tactile alert techniques may also be employed based on user preferences. Aural, visual and/or tactile alerts may be displayed separately or in any combination and the pilot may have the ability to turn off the alarms, for example, by using the pilot interface device 134 (shown in FIG. 2) or the pilot health monitoring system 137. The pilot health monitoring system 137 may communicate the pilot's health/alertness status to dispatch periodically, or when the pilot health monitoring system 137 records other than normal health/alertness readings.

After alerting the crew/dispatch at 214, the emergency descent system 100 may again monitor the cabin pressure altitude at 216. If the cabin pressure altitude remains above the first preset value, but below a second preset value, for example 18,000 feet MSL, the emergency descent system 100 may continue to alert the crew/dispatch at 214 and monitor the cabin pressure altitude of the aircraft at 216. If the cabin pressure altitude exceeds the second preset value at 216, the emergency descent system 100 may begin timing at 218. The emergency descent system 100 may time for a preset amount of time, for example, 30 seconds (as determined by the user) while continually monitoring the cabin pressure altitude. If desired, the second preset value may be set the same as the first preset value.

If after the predetermined amount of time the cabin pressure altitude remains above the second preset value, the emergency descent system may determine the MSA and check for preplanned escape routes at 220. The preplanned escape routes were determined during preflight at 206 and may be stored in the FMC and displayed on a separate display page. The MSA is an altitude which is defined in the FARs for a location or airway segment. The MSA is generally 1000 feet above the highest obstacle within a certain distance from the flight plan route centerline. The MSA increases to 2000 feet above the highest obstacle within a certain distance from the flight plan route in mountainous terrain. Regions of mountainous terrain are defined in the Airman's Information Manual (AIM) and include various geographic regions around the globe. MSAs are defined for each segment on an airway route and this altitude is guaranteed to be clear of obstacles within a certain distance of the airway centerline. Therefore, the MSA may be the lowest safe altitude to which the aircraft is allowed to descend when in Instrument Meteorological Conditions (IMC).

Additionally, the emergency descent system may store the list of escape routes determined during preflight for immediate recall when required. When the aircraft is on a flight route segment including an escape route, the emergency descent system may recall the escape route, transmit the escape route to the FMS and activate the escape route in the flight plan in the event of loss of cabin pressurization.

If the aircraft is not operating on an airway, the emergency descent system 100 may determine the MSA based on terrain heights from the database 116 or a preplanned escape route. The emergency descent system may calculate the MSA based on the highest terrain and/or obstacle along the planned flight path and add 1000 feet (2000 feet in mountainous terrain) to that altitude.

Prior to initiating an emergency descent, the emergency descent system may alert the crew that a descent is imminent at 221. This warning may be provided a predetermined amount of time before descent initiation. This predetermined amount of time may be selectable, for example, the emergency descent system may provide an alert 30 seconds prior to descent initiation. This alert may allow the flight crew to cancel the descent if required. Additionally, the emergency descent system may skip this alert if the pilot's health is the triggering event for the emergency descent.

Once the emergency descent system 100 has determined the appropriate MSA and/or escape route for the aircraft location, the emergency descent system 100 may send a signal to the autopilot 132 and/or autothrottles (not shown) at 222. This signal may instruct the autopilot 132 and/or autothrottles to engage, if not already engaged, and descend the aircraft to the MSA either along the current FMS flight plan or the escape route if one exists, or along the current aircraft heading. After beginning the descent, the emergency descent system 100 may communicate with a ground station at 224 via the communication device 136. The emergency descent system may communicate with multiple ground stations, if desired, at 224. For example, the emergency descent system 100 may broadcast a message to Air Traffic Control (ATC) with a pre-recorded or synthesized voice and/or data via a datalink. The emergency descent system 100 may also broadcast the message over the last used radio frequency and/or over "guard" frequency which is an emergency frequency and generally is 121.5 MHz, 243.0 MHz and/or 8.125 MHz (other guard frequencies exist and may be added/deleted based on national regulations).

The emergency descent system 100 may also broadcast a message to company dispatch on a company frequency for the geographic area of operation. In this way, the emergency descent system 100 may alert the proper authorities that an emergency descent is required and being executed by the aircraft.

During the descent, the emergency descent system 100 may monitor aircraft altitude and cabin pressure altitude and instruct the autopilot 132 to level the aircraft at the MSA at 226. The emergency descent system 100 may also instruct the autopilot to maintain the FMS flight plan, if a flight plan exists in the FMS, or to maintain aircraft heading. The emergency descent system 100 may then determine the MSA at 228 for the next flight plan segment via the method discussed above. If no flight plan exists, the emergency descent system 100 may either instruct the autopilot 132 to perform holding at the present position, continue on the present heading or proceed to the destination or origin.

If the emergency descent system 100 instructs the autopilot 132 to continue on the present heading or proceed to the destination or origin, the emergency descent system 100 may determine the MSA for roughly equal distances along the present heading, for example, every 20 miles. This may allow the aircraft to maintain the lowest safe altitude along the present heading without constant climbs or descents. The emergency descent system 100 may instruct the autopilot 132 to climb and/or descend to the next segment MSA if different from the current MSA at 230.

Once at the MSA, the emergency descent system 100 may continually update the aircraft position at 232, determine the next segment MSA at 234 and instruct the autopilot to climb or descend as required at 236. The emergency descent system 100 may instruct the autopilot 132 to maintain MSA until the pilot assumes control of the aircraft by disengaging the emergency descent system 100 via the pilot interface device 134.

Figure 4:
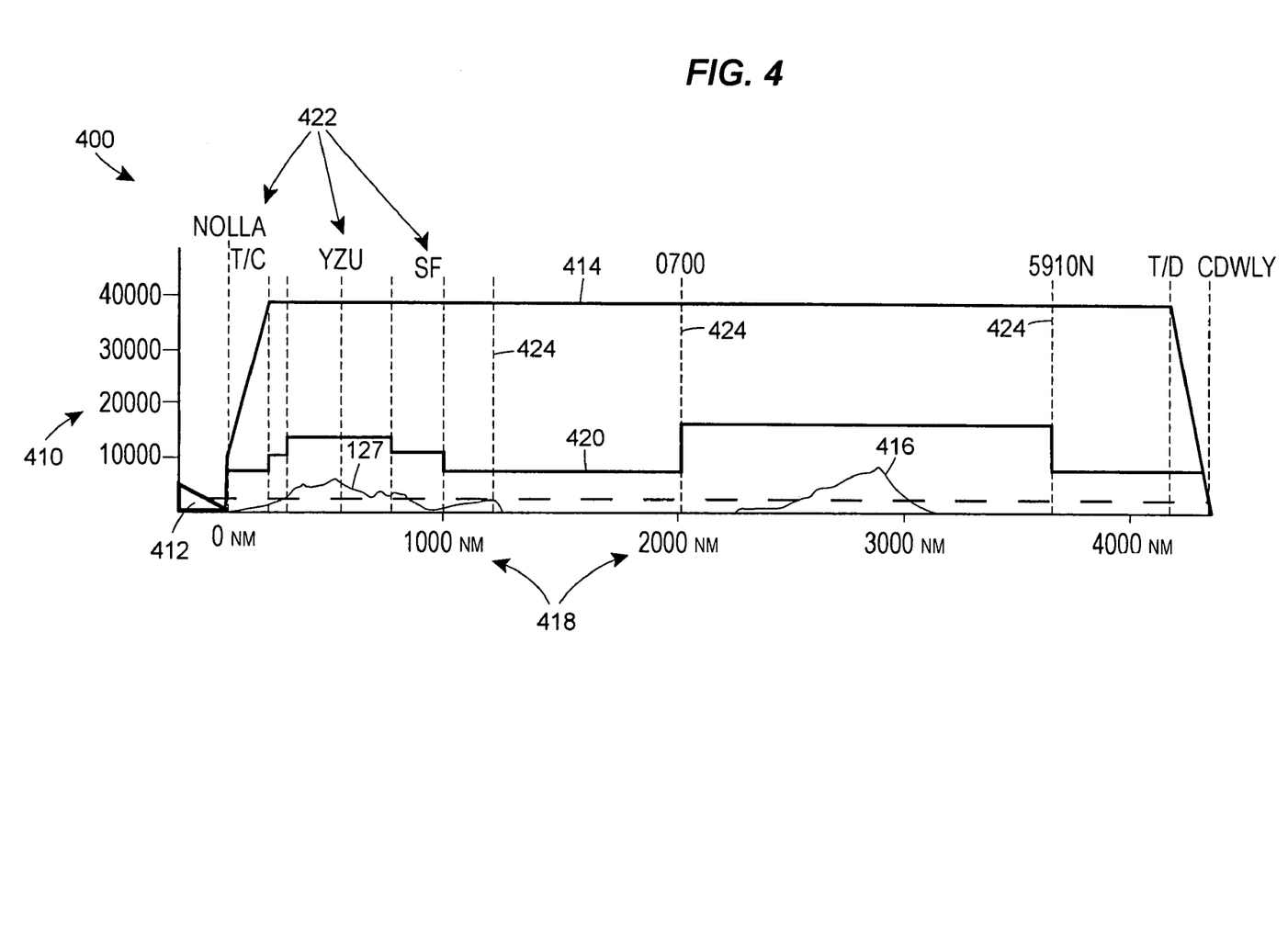
FIG. 4 is a graphical side view of an aircraft flight path and terrain features on the earth.

An example of a graphical side view 400 of a flight path 414 is shown in FIG. 4. Altitude is indicated by the scale 410 on the left side of the figure. The bottom axis of the figure shows distance 418 in nautical miles. The distance may be shown in any other unit of measure, such as, for example, meters, kilometers, feet, yards, etc.

An aircraft representation shown as a triangle 412 represents the aircraft's position in relation to waypoints 422 and the flight path 414. Terrain 416 is generally represented by a line near the bottom of the figure and may be indicative of the height of the terrain and the distance from the aircraft location. The minimum safe altitude (MSA) 420 is shown in relation to the terrain 416. Flight plan segments may be generally broken up by the waypoints 422 and shown by the dotted lines 424. As shown in the figure, the MSA 420 may be a different altitude for each flight plan segment. The MSA 420 may be generally higher in the vicinity of higher terrain.

Figure 5:
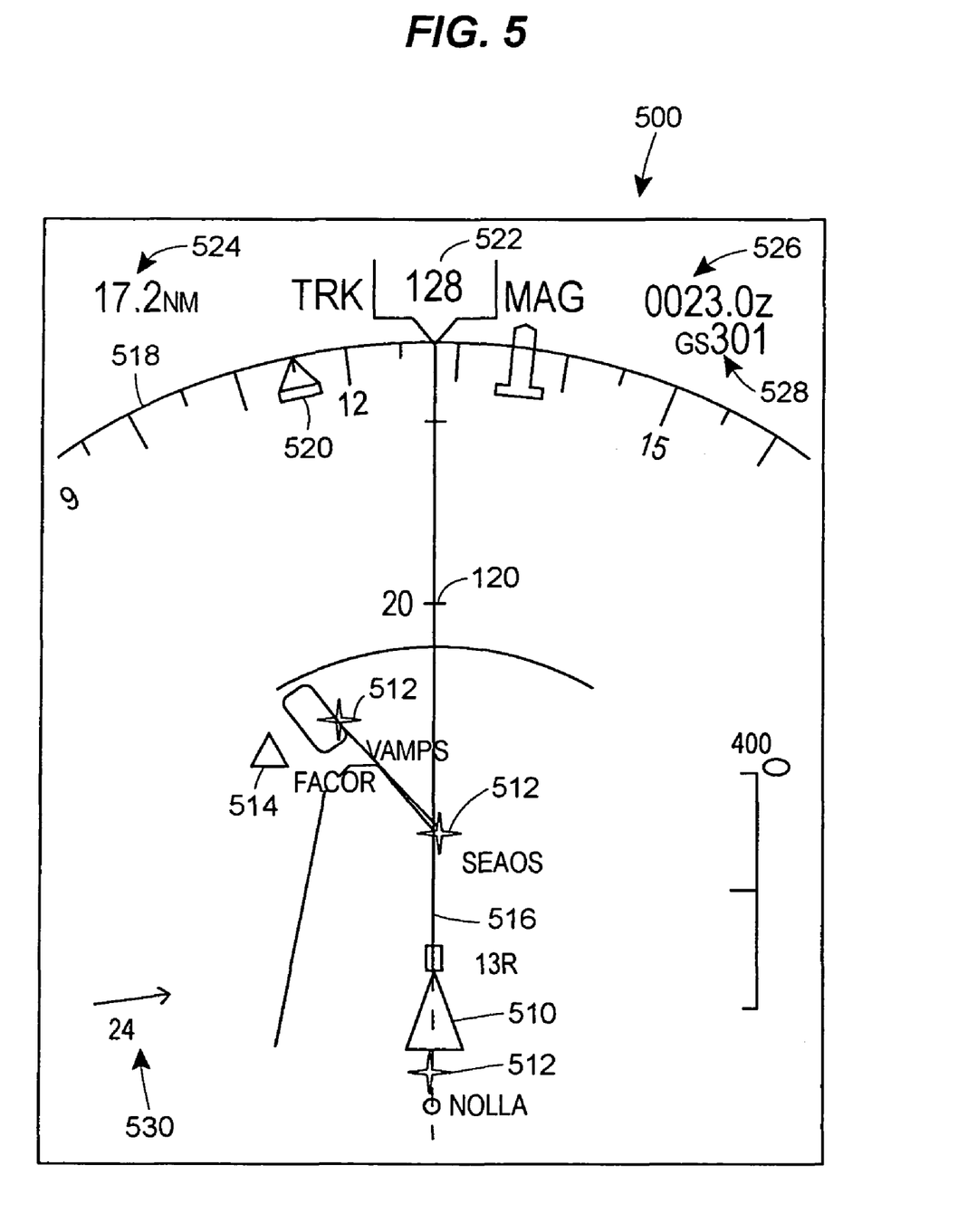
FIG. 5 is an example of a navigation display.

Certain features of the descent system may be incorporated into other aircraft systems, for example, the navigational display (ND), the flight management system (FMS) and the vertical situation display (VSD). FIG. 5 is an example of a navigational display (ND) 500. The ND 500 generally shows the aircraft position represented by a triangle 510, waypoints 512, 514 and a flight path 516. A compass rose 518, heading information 520, track information 522, distance to next waypoint 524, estimated time of arrival (ETA) 526 at the next waypoint, ground speed 528 and wind direction 530 may also be displayed. MSA information may or may not be displayed on the ND 500. However, if the MSA is displayed on the ND 500, the pilot may easily reference the MSA if the aircraft is not on the flight plan centerline, but may be close to the flight plan centerline, thereby giving the pilot at least a general idea of what a safe altitude may be.

Figure 6:
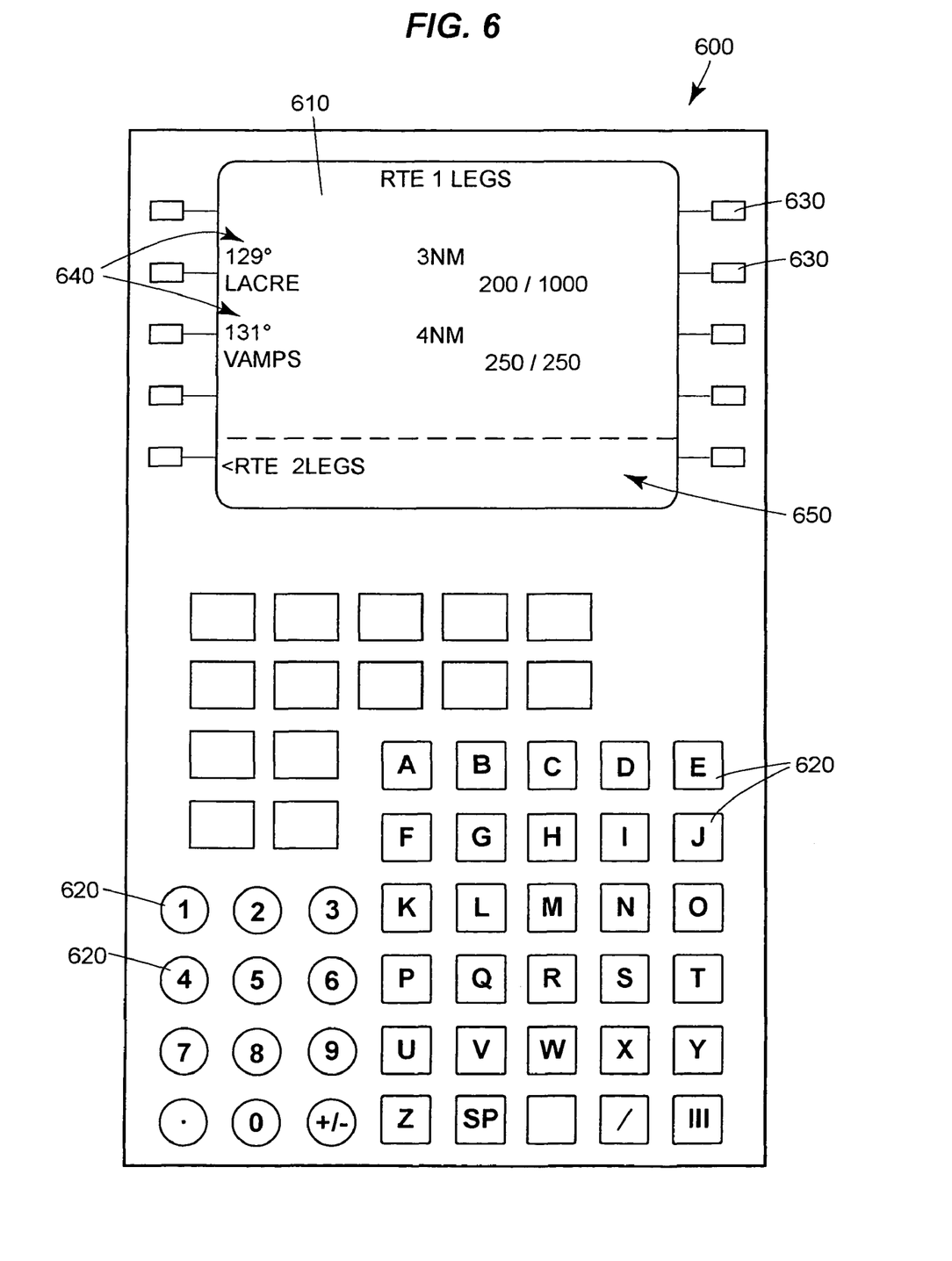
FIG. 6 is an example of a flight management system control and display

FIG. 6 is an example of a Flight Management System (FMS) Control and Display Unit (CDU) 600. The CDU 600 may include a display area 610, data entry keys 620 and line select keys 630. In the example of FIG. 6, the CDU 600 is displaying flight route leg information 640. The flight route leg information 640 may include leg bearing, waypoint name, distance and/or any other flight route leg information 640 desired by the user, including, but not limited to MSA (not shown). The emergency descent system may continually calculate MSA and display it with the flight route leg information 640 on the CDU 600. This may enable the pilot to quickly determine a minimum safe altitude for the particular leg he/she is interested in. The display area 610 further includes a scratchpad area 650. Any entry made by way of the data entry keys 620 first displays in the scratchpad area 650. While displayed in the scratchpad area 650, the pilot may check or modify data before entry into the FMS.

Figure 7:
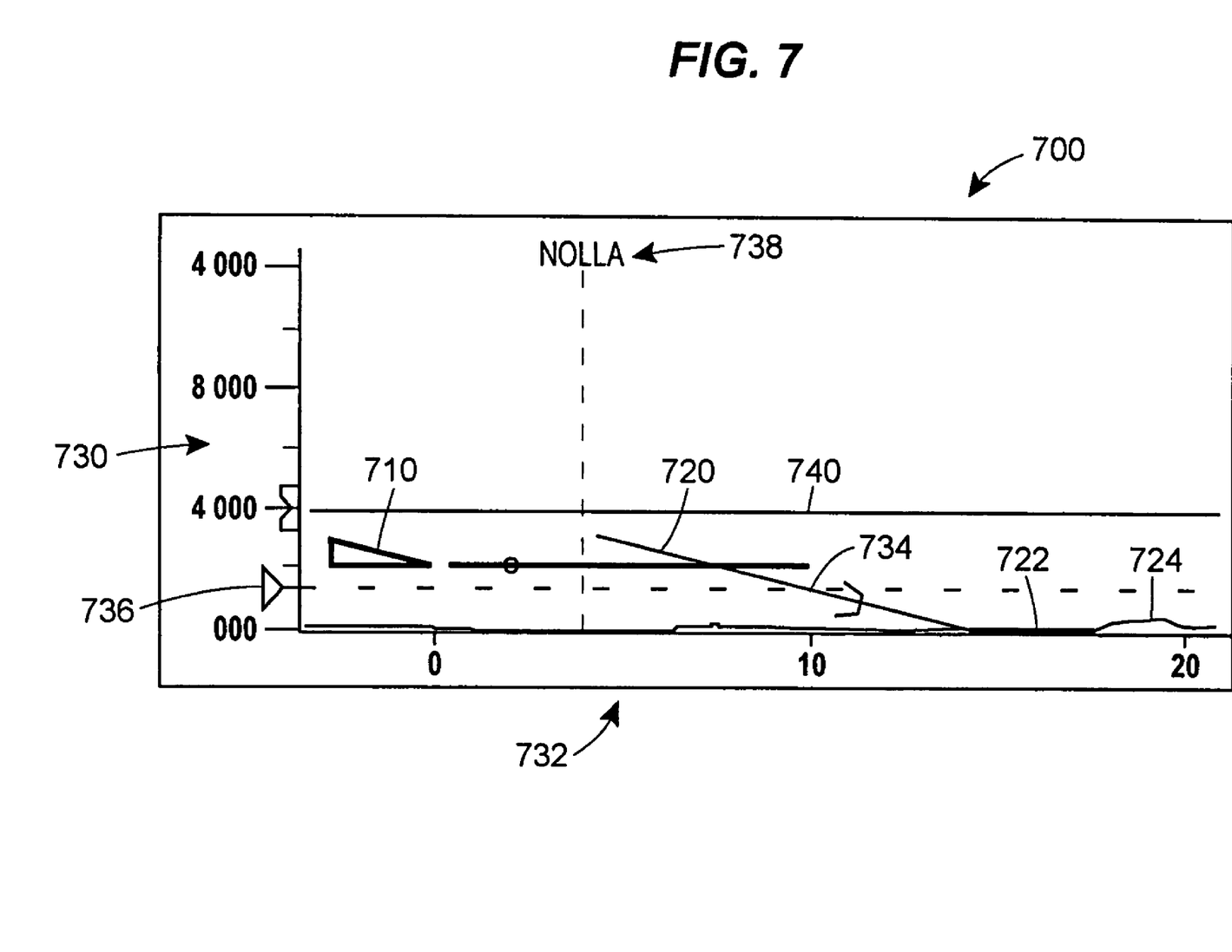
FIG. 7 is an example of a vertical situation display.

FIG. 7 is an example of a vertical situation display 700 which may be used in an aircraft. The vertical situation display 700 may depict a side view of an aircraft represented by a triangle 710, and the aircraft's flight plan 720. The vertical situation display 700 may include a representation of a runway 722 and terrain 724 in addition to other items. A scale 730 on the left side of the vertical situation display 700 may indicate altitude and a bottom scale 732 may indicate distance from the aircraft. Other items which may be shown on the vertical situation display 700 are an instrument approach glideslope 734 and a minimum descent altitude 736 which may correspond to an instrument approach procedure. The vertical situation display 700 may also indicate waypoints 738. Finally, the minimum safe altitude (MSA) may be displayed as a line 740 on the vertical situation display 700. In this way, the emergency descent system may allow a pilot to rapidly discern the aircraft altitude in relation to the MSA.

Figure 8:
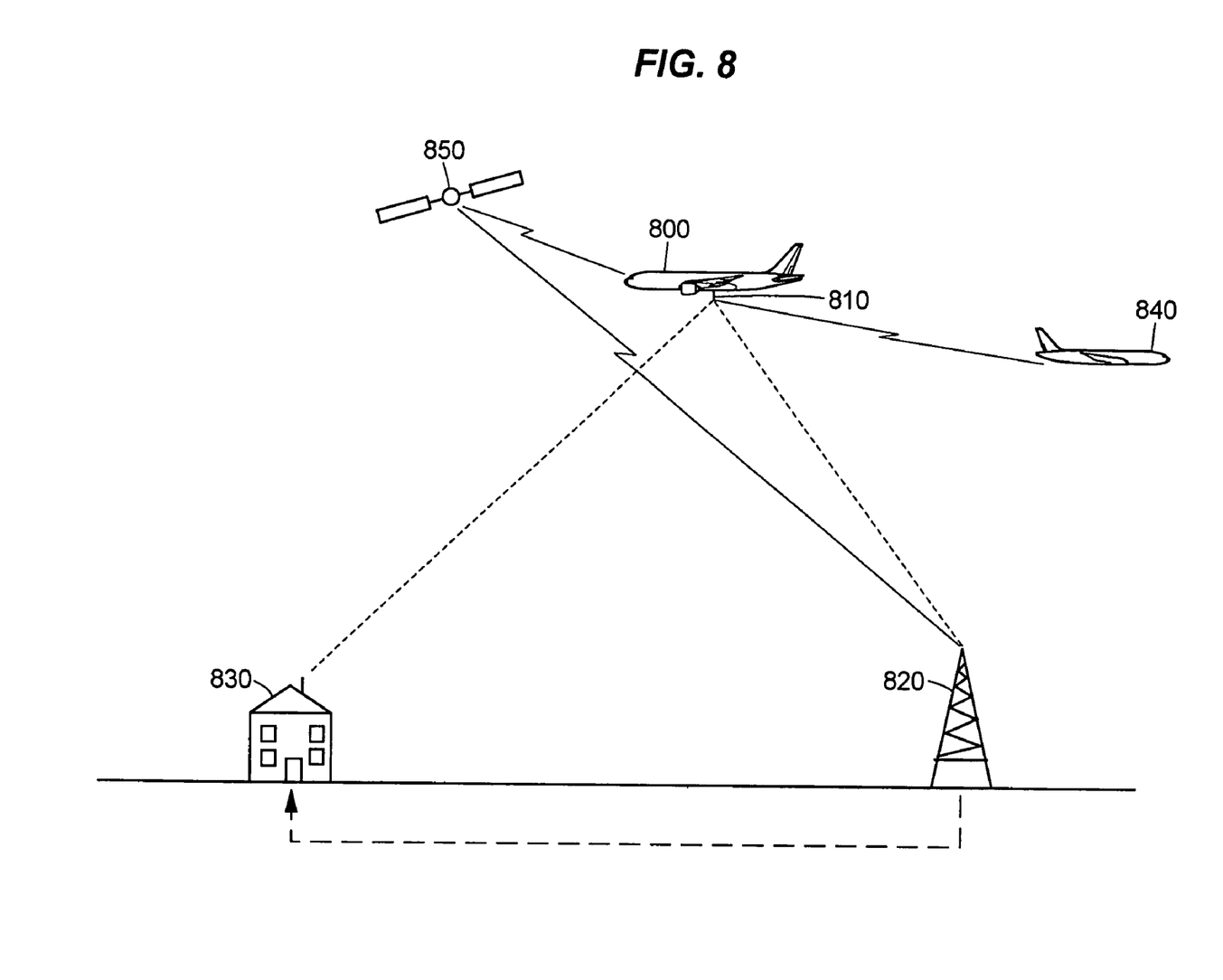
FIG. 8 is a diagram of an emergency descent system communicating with a ground station.

FIG. 8 shows a representation of how the emergency descent system 100 may communicate with ground stations. The emergency descent system 100 may use an antenna 810 on an aircraft 800 to broadcast radio signals to other aircraft 840, a satellite 850 and/or to a remote ground station 820 or a ground facility 830 such as Air Traffic Control (ATC) or company dispatch. Regardless, the emergency descent system 100 may transmit the radio signal whenever the emergency descent system 100 is about to initiate or has initiated an emergency descent, thereby alerting ground facilities which may take action to reroute other air traffic if necessary or take other appropriate action.

Although the preferred embodiments of the invention have been disclosed for illustrative purposes, those skilled in the art will appreciate that various modifications, additions and substitutions are possible, without departing from the scope and spirit of the invention as disclosed herein and in the accompanying claims. For example, the system may be adapted for use in any vehicle which requires an operator, such as, for example, an aircraft, a ship, a space vehicle, an automobile, a truck, a train, or any other vehicle, system which requires an operator during operations.

What is claimed is:

1. An emergency descent system for a vehicle comprising: a processor; a memory accessible by the processor, the memory including a software program executable by the processor, a terrain database and a flight plan route; a navigation system which provides the processor with positional information; a static pressure instrument, representative of a pressure altitude within the vehicle, that provides the processor with static pressure data; an automatic pilot which controls the vehicle when engaged; and a health/alertness monitoring system operatively connected to the processor for monitoring a health/alertness of a pilot operating the vehicle; wherein the emergency descent system checks the flight plan route during pre-flight to determine if a descent to a certain altitude along any flight plan segment of the flight plan route would intersect a minimum safe altitude for that flight plan segment, and if the descent to the certain altitude would intersect the minimum safe altitude, the emergency descent system checks a database for a preplanned escape route for that flight plan segment and stores the preplanned escape route for use if needed on the flight plan segment; wherein the processor monitors the static pressure instrument, the health/alertness monitoring system and the positional information, and directs the automatic pilot to decrease the vehicle altitude when the static pressure falls below a predetermined pressure.

2. The emergency descent system of claim 1, wherein the processor directs the automatic pilot to decrease the vehicle altitude when the health/alertness monitoring system returns a signal which is at least one of unsatisfactory and indicates a loss of consciousness.

3. The emergency descent system of claim 1, wherein the navigation system receives position inputs from one of a global positioning system (GPS), an inertial navigation system (INS) and a ground based navigational aid.

4. The emergency descent system of claim 1, wherein the software program is adapted to convert the static pressure into a cabin pressure altitude.

5. The emergency descent system of claim 4, wherein the software program is adapted to determine the minimum safe altitude for each flight plan segment of the flight plan route.

6. The emergency descent system of claim 1, including a pilot interface device adapted to disengage the emergency descent system.

7. The emergency descent system of claim 6, wherein the pilot interface device is part of the automatic pilot.

8. The emergency descent system of claim 7, including a flight management system, wherein the flight management system supplies flight plan information to the memory for use by the software program.

9. The emergency descent system of claim 1, including a communication device.

10. The emergency descent system of claim 9, wherein the communication device is a radio.

11. The emergency descent system of claim 9, wherein the communication device is a data link.

12. The emergency descent system of claim 10, wherein the radio is a very high frequency (VHF) radio.

13. The emergency descent system of claim 10, wherein the processor sends a signal to a ground station through the communication device which informs the ground station that the vehicle is descending.

14. The emergency descent system of claim 1, wherein the vehicle is an aircraft.

15. A method of reducing the altitude of a vehicle comprising: checking a flight plan route of the vehicle during pre-flight to determine if a descent to a certain altitude along any flight plan segment of the flight plan route would intersect a minimum safe altitude for that flight plan segment, and if the descent to the certain altitude would intersect the minimum safe altitude, checking a database for a preplanned escape route for that flight plan segment and storing the preplanned escape route for use if needed on the flight plan segment; updating a vehicle position; monitoring a pressure indication; alerting at least one of a pilot of the vehicle and a flight crew if the pressure indication indicates a cabin altitude above a predetermined altitude; engaging an autopilot and auto-throttles to automatically decrease vehicle altitude if the pressure indication indicates the cabin altitude is above the predetermined altitude; and, if the pressure indication indicates the cabin altitude is above the predetermined altitude, instructing the autopilot to at least one of follow the preplanned escape route and level the vehicle at the minimum safe altitude.

16. The method of claim 15 including, transmitting a signal via an aircraft antenna to a ground station.

17. The method of claim 16, wherein the signal is a radio signal and is transmitted on an emergency radio frequency.

18. The method of claim 16 wherein the signal is transmitted via a datalink.

19. The method of claim 15, wherein the vehicle position is updated via one of an inertial navigation system (INS), a global positioning system (GPS) and ground based navigational aids (NAVAIDs).

20. The method of claim 15, wherein the minimum safe altitude is determined for each flight plan segment.

21. The method of claim 15, wherein the autopilot includes a pilot interface device.

22. The method of claim 15, wherein a flight management system provides flight plan information.

23. The method of claim 15, wherein the vehicle is an aircraft.

24. The emergency descent system of claim 1 wherein the processor directs the automatic pilot to decrease the vehicle altitude to between 10,000 and 18,000 feet when the health/ alertness monitoring system indicates that the health/alertness of the pilot operating the vehicle is unsatisfactory.

25. The emergency descent system of claim 1 wherein the processor directs the automatic pilot to decrease the vehicle altitude when the altitude of the vehicle is above 18,000 feet.

26. The emergency descent system of claim 25 wherein the processor directs the automatic pilot to decrease the vehicle altitude to between 10,000 feet and 18,000 feet when the vehicle altitude is above 18,000 feet.

27. The method of claim 15 wherein the autopoilot and the auto-throttles automatically decrease the altitude of the vehicle when a health/alertness monitoring system indicates that the health/alertness of the pilot operating the vehicle is at least one of unsatisfactory and unconscious.

28. The method of claim 15 wherein the automatic pilot automatically decreases the vehicle altitude when static pressure inside the vehicle falls below a predetermined pressure.

29. The method of claim 28 wherein the automatic pilot automatically decreases the vehicle altitude when the altitude of the vehicle is above 18,000 feet.

30. The method of claim 29 wherein the automatic pilot automatically decreases the vehicle altitude to between 10,000 feet and 18,000 feet when the vehicle altitude is above 18,000 feet.

31. The method of claim 27 wherein the autopilot and the auto-throttles automatically decrease the altitude of the vehicle to between 10,000 and 18,000 feet when the health/alertness monitoring system indicates that the health/alertness of the pilot operating the vehicle is at least one of unsatisfactory and unconscious.

32. The emergency descent system of claim 1 wherein the certain altitude is 10,000 feet.

33. The emergency descent system of claim 1 wherein the emergency descent system notifies at least one of the pilot and flight crew if the preplanned escape route exist for the flight plan segment.

34. The emergency descent system of claim 1 wherein the processor directs the automatic pilot to follow the preplanned escape route if the static pressure falls below the predetermined pressure in the flight plan segment having the preplanned escape route.

35. The emergency descent system of claim 1 wherein the emergency descent system communicates with at least one of a ground station, air traffic control, and other aircraft if the static pressure falls below the predetermined pressure and the automatic pilot decreases the vehicle altitude.

36. The emergency descent system of claim 2 wherein the emergency descent system alerts at least one of flight crew and the pilot if the health/alertness monitoring system returns the signal which is at least one of unsatisfactory and indicates a loss of consciousness.

37. The method of claim 15 wherein the certain altitude is 10,000 feet.

38. The method of claim 15 further comprising at least one of the pilot and the flight crew being notified if the preplanned escape route exist for the flight segment.

39. The method of claim 15 further comprising the autopilot following the preplanned escape route if the pressure indication indicates the cabin altitude is above the predetermined altitude in the flight plan segment having the preplanned escape route.

40. The method of claim 15 further comprising communicating with at least one of a ground station, air traffic control, and other aircraft if the pressure indication indicates the cabin altitude is above the predetermined altitude and the autopilot decreases the vehicle altitude.

41. The method of claim 27 further comprising alerting at least one of the flight crew and the pilot if the health/alertness monitoring system returns a signal indicating that the health/alertness of the pilot is at least one of unsatisfactory and indicates a loss of consciousness.

* * * * *